(12) United States Patent
Ngai et al.

(10) Patent No.: US 6,996,186 B2
(45) Date of Patent: Feb. 7, 2006

(54) PROGRAMMABLE HORIZONTAL FILTER WITH NOISE REDUCTION AND IMAGE SCALING FOR VIDEO ENCODING SYSTEM

(75) Inventors: Agnes Y. Ngai, Endwell, NY (US); Roger S. Rutter, Oswego, NY (US); Robert L. Woodard, Newark Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 656 days.

(21) Appl. No.: 10/080,745

(22) Filed: Feb. 22, 2002

(65) Prior Publication Data

US 2003/0160899 A1 Aug. 28, 2003

(51) Int. Cl.
*H04N 7/12* (2006.01)
*H04N 11/02* (2006.01)

(52) U.S. Cl. ................................. 375/240.29
(58) Field of Classification Search ............... 348/607, 348/606, 625, 536, 581; 375/240.29, 243, 375/346, 350; 382/210, 260
See application file for complete search history.

(56) References Cited

U.S. PATENT DOCUMENTS

| | | | |
|---|---|---|---|
| 4,882,627 A | 11/1989 | Keesen et al. ............... 358/166 |
| 5,367,629 A | 11/1994 | Chu et al. .................... 395/162 |
| 5,438,374 A | 8/1995 | Yan ............................ 348/620 |
| 5,502,489 A | 3/1996 | Kim et al. ................... 348/607 |
| 5,557,330 A | 9/1996 | Astle .......................... 348/394 |
| 5,606,373 A | 2/1997 | Dopp et al. ................. 348/459 |
| 5,621,465 A | 4/1997 | Kondo ........................ 348/395 |
| 5,621,468 A | 4/1997 | Kim ............................ 348/416 |
| 5,764,307 A | 6/1998 | Ozcelik et al. ............. 348/608 |
| 5,867,221 A | 2/1999 | Pullen et al. ............... 348/417 |
| 5,926,220 A | 7/1999 | Linzer ........................ 348/931 |
| 5,926,224 A | 7/1999 | Nagasawa ................... 348/413 |
| 5,953,506 A | 9/1999 | Kalra et al. ............ 395/200.61 |
| 5,959,693 A * | 9/1999 | Wu et al. .................... 348/624 |
| 5,974,193 A | 10/1999 | Baudouin ................... 382/261 |
| 5,977,947 A | 11/1999 | Potu ............................ 345/127 |
| 6,005,626 A | 12/1999 | Ding .......................... 348/416 |
| 6,037,986 A | 3/2000 | Zhang et al. ............... 348/409 |
| 6,061,100 A | 5/2000 | Ward et al. ................. 348/607 |
| 6,067,125 A | 5/2000 | May ............................ 348/607 |
| 6,108,047 A | 8/2000 | Chen .......................... 348/581 |
| 6,208,693 B1 | 3/2001 | Chen et al. ............ 375/240.24 |

(Continued)

OTHER PUBLICATIONS

Clear Motion Integrated Noise Reduction System, DiviCom, Sep. 1999.

(Continued)

*Primary Examiner*—Vu Le
*Assistant Examiner*—Behrooz Senfi
(74) *Attorney, Agent, or Firm*—William H. Steinberg, Esq.; Kevin P. Radigan, Esq.; Heslin Rothenberg Farley & Mesiti, P.C.

(57) ABSTRACT

A technique is provided for programmably horizontally filtering pixel values of frames of a plurality of video frames. The technique includes, in one embodiment, passing pixel values through a real-time horizontal filter disposed as preprocessing logic of a video encode system. The horizontal filter is programmable and includes a filter coefficients buffer for holding multiple sets of filter coefficients. The horizontal filter programmably employs the multiple sets of filter coefficients to selectively perform spatial noise filtering, or spatial noise filtering and image scaling on the pixels. The filter coefficients are also programmable and may be changed dynamically and repeatedly, with changes being applied at frame boundaries. When performing image scaling, multiple sets of filter coefficients are employed.

22 Claims, 15 Drawing Sheets

U.S. PATENT DOCUMENTS

| | | | |
|---|---|---|---|
| 6,233,277 B1 | 5/2001 | Ozcelik et al. | 375/240.02 |
| 6,239,847 B1 * | 5/2001 | Deierling | 348/581 |
| 2002/0118887 A1 * | 8/2002 | Gindele | 382/260 |
| 2004/0212734 A1 * | 10/2004 | Macinnis et al. | 348/536 |

OTHER PUBLICATIONS

Interpolating Images To Higher Resolution Using A Feed-forwarding 'Neural', IBM Technical Disclosure Bulletin, vol. 35., No. 1A, Jun. 1992.

"Design of HDTV subband filterbanks considering VLSI implementation constraints", Pestel, U.; Gruger, K., IEEE Trans. on Circuits and System for Video Technology, Mar. 1991, vol. 1, Is. 1, pp. 14-21.

Efficient DCT-Domain Pre-filtering inside a Video Encoder, S.D. Kim, et al., Proceedings of the SPIE—The International Society for Optical Engineering, vol. 4067, pt. 1-3, pp. 1579-1588.

J.D. Greenfield, et al., pending U.S. Appl. No. 09/838,758, filed Apr. 19, 2001, entitled "Simultaneous Vertical Spatial Filtering And Chroma Conversion In Video Images".

* cited by examiner

KEY: HORIZONTAL NOISE REDUCTION FILTER AND SCALER

(EXAMPLE: NOISE REDUCTION ONLY)
P = 'ORIGINAL' PIXELS
C = FILTER COEFFICIENTS ($C_1 - C_8$, 'PHASE 0' ONLY)
F = FILTERED PIXEL OUTPUT

BEGINNING OF LINE (LUMINANCE DATA)

$[(P_1 \cdot C_1)+(P_1 \cdot C_2)+(P_1 \cdot C_3)+(P_1 \cdot C_4)+(P_2 \cdot C_5)+(P_3 \cdot C_6)+(P_4 \cdot C_7)+(P_5 \cdot C_8)]/256 = F_1$
$[(P_1 \cdot C_1)+(P_1 \cdot C_2)+(P_1 \cdot C_3)+(P_2 \cdot C_4)+(P_3 \cdot C_5)+(P_4 \cdot C_6)+(P_5 \cdot C_7)+(P_6 \cdot C_8)]/256 = F_2$
$[(P_1 \cdot C_1)+(P_1 \cdot C_2)+(P_2 \cdot C_3)+(P_3 \cdot C_4)+(P_4 \cdot C_5)+(P_5 \cdot C_6)+(P_6 \cdot C_7)+(P_7 \cdot C_8)]/256 = F_3$
$[(P_1 \cdot C_1)+(P_2 \cdot C_2)+(P_3 \cdot C_3)+(P_4 \cdot C_4)+(P_5 \cdot C_5)+(P_6 \cdot C_6)+(P_7 \cdot C_7)+(P_8 \cdot C_8)]/256 = F_4$
$[(P_2 \cdot C_1)+(P_3 \cdot C_2)+(P_4 \cdot C_3)+(P_5 \cdot C_4)+(P_6 \cdot C_5)+(P_7 \cdot C_6)+(P_8 \cdot C_7)+(P_9 \cdot C_8)]/256 = F_5$

...

END OF LINE (HORIZ. SIZE = 720 PIXELS)

$[(P_{713} \cdot C_1)+(P_{714} \cdot C_2)+(P_{715} \cdot C_3)+(P_{716} \cdot C_4)+(P_{717} \cdot C_5)+(P_{718} \cdot C_6)+(P_{719} \cdot C_7)+(P_{720} \cdot C_8)]/256 = F_{716}$
$[(P_{714} \cdot C_1)+(P_{715} \cdot C_2)+(P_{716} \cdot C_3)+(P_{717} \cdot C_4)+(P_{718} \cdot C_5)+(P_{719} \cdot C_6)+(P_{720} \cdot C_7)+(P_{720} \cdot C_8)]/256 = F_{717}$
$[(P_{715} \cdot C_1)+(P_{716} \cdot C_2)+(P_{717} \cdot C_3)+(P_{718} \cdot C_4)+(P_{719} \cdot C_5)+(P_{720} \cdot C_6)+(P_{720} \cdot C_7)+(P_{720} \cdot C_8)]/256 = F_{718}$
$[(P_{716} \cdot C_1)+(P_{717} \cdot C_2)+(P_{718} \cdot C_3)+(P_{719} \cdot C_4)+(P_{720} \cdot C_5)+(P_{720} \cdot C_6)+(P_{720} \cdot C_7)+(P_{720} \cdot C_8)]/256 = F_{719}$
$[(P_{717} \cdot C_1)+(P_{718} \cdot C_2)+(P_{719} \cdot C_3)+(P_{720} \cdot C_4)+(P_{720} \cdot C_5)+(P_{720} \cdot C_6)+(P_{720} \cdot C_7)+(P_{720} \cdot C_8)]/256 = F_{720}$

*fig. 12*

KEY: HORIZONTAL NOISE REDUCTION FILTER AND SCALER
(EXAMPLE: 2/3 HORIZONTAL IMAGE SCALING)
P = 'ORIGINAL' PIXELS
C = FILTER COEFFICIENTS – ($C_1$–$C_8$) (PHASE 0 AND PHASE 1)
F = FILTERED PIXEL OUTPUT

BEGINNING OF LINE (LUMINANCE DATA)

$[(P_1 \cdot C_1)+(P_1 \cdot C_2)+(P_1 \cdot C_3)+(P_1 \cdot C_4)+(P_2 \cdot C_5)+(P_3 \cdot C_6)+(P_4 \cdot C_7)+(P_5 \cdot C_8)]/256$
($C_1$–$C_8$) PHASE 0 = $F_1$ (KEEP)

$[(P_1 \cdot C_1)+(P_1 \cdot C_2)+(P_1 \cdot C_3)+(P_2 \cdot C_4)+(P_3 \cdot C_5)+(P_4 \cdot C_6)+(P_5 \cdot C_7)+(P_6 \cdot C_8)]/256$
($C_1$–$C_8$) PHASE 1 = $F_2$ (KEEP)

$[(P_1 \cdot C_1)+(P_1 \cdot C_2)+(P_2 \cdot C_3)+(P_3 \cdot C_4)+(P_4 \cdot C_5)+(P_5 \cdot C_6)+(P_6 \cdot C_7)+(P_7 \cdot C_8)]/256$
($C_1$–$C_8$) PHASE 1 = $F_3$ (DROP)

$[(P_1 \cdot C_1)+(P_2 \cdot C_2)+(P_3 \cdot C_3)+(P_4 \cdot C_4)+(P_5 \cdot C_5)+(P_6 \cdot C_6)+(P_7 \cdot C_7)+(P_8 \cdot C_8)]/256$
($C_1$–$C_8$) PHASE 0 = $F_4$ (KEEP)

$[(P_2 \cdot C_1)+(P_3 \cdot C_2)+(P_4 \cdot C_3)+(P_5 \cdot C_4)+(P_6 \cdot C_5)+(P_7 \cdot C_6)+(P_8 \cdot C_7)+(P_9 \cdot C_8)]/256$
($C_1$–$C_8$) PHASE 1 = $F_5$ (KEEP)

$[(P_3 \cdot C_1)+(P_4 \cdot C_2)+(P_5 \cdot C_3)+(P_6 \cdot C_4)+(P_7 \cdot C_5)+(P_8 \cdot C_6)+(P_9 \cdot C_7)+(P_{10} \cdot C_8)]/256$
($C_1$–$C_8$) PHASE 1 = $F_6$ (DROP)

PROGRAMMABLE HORIZONTAL FILTER WITH NOISE REDUCTION AND IMAGE SCALING FOR VIDEO ENCODING SYSTEM

CROSS-REFERENCE TO RELATED APPLICATIONS

This application contains subject matter which is related to the subject matter of the following applications, each of which is assigned to the same assignee as this application and filed on the same day as this application. Each of the below-listed applications is hereby incorporated herein by reference in its entirety:

"Programmable Vertical Filter for Video Encoding", by Ngai et al., U.S. Ser. No. 10/081,778; and "Programmable And Adaptive Temporal Filter For Video Encoding", by Murdock et al., U.S. Ser. No. 10/080,963.

TECHNICAL FIELD

This invention relates in general to compression of digital visual images, and more particularly, to a technique for programmably, spatially horizontally filtering pixel values of a plurality of motion video frames, including selectively performing noise filtering and image scaling thereof using dynamically programmable filter coefficients.

BACKGROUND OF THE INVENTION

Technological advances in digital transmission networks, digital storage media, very large scale integration devices, and digital processing of video and audio signals have been converging to make the transmission and storage of digital video economical in a wide variety of applications. Because the storage and transmission of digital video signals is central to many applications, and because an uncompressed representation of a video signal requires a large amount of storage, the use of digital video compression techniques is vital to this advancing art. In this regard, several international standards for the compression of digital video signals have emerged over the past decade, with more currently under development. These standards apply to algorithms for the transmission and storage of compressed digital video in a variety of applications, including: video-telephony and teleconferencing; high quality digital television transmission on coaxial and fiberoptic networks, as well as broadcast terrestrially and other direct broadcast satellites; and in interactive multimedia products on CD-ROM, Digital Audio Tape, and Winchester disk drives.

Several of these standards involve algorithms based on a common core of compression techniques, e.g., the CCITT (Consultative Committee on International Telegraphy and Telephony) Recommendation H.120, the CCITT Recommendation H.261, and the ISO/IEC MPEG-1 and MPEG-2 standards. The MPEG algorithms have been developed by the Moving Picture Experts Group (MPEG), part of a joint technical committee of the International Standards Organization (ISO) and the International Electrotechnical Commission (IEC). The MPEG committee has been developing standards for the multiplexed, compressed representation of video and associated audio signals.

The MPEG-2 standard describes an encoding method that results in substantial bandwidth reduction by a subjective lossy compression followed by a lossless compression. The encoded, compressed digital data is subsequently decompressed and decoded in an MPEG-2 compliant decoder. The MPEG-2 standard specifies a very high compression technique that achieves compression not achievable with intraframe coding alone, while preserving the random access advantages of pure intraframe coding. The combination of frequency domain intraframe encoding and interpolative/predictive interframe encoding of the MPEG-2 standard results in a balance between intraframe encoding and interframe encoding.

The MPEG-2 standard exploits temporal redundancy for motion compensated interpolative and predictive encoding. That is, an assumption is made that "locally" the current picture can be modeled as a translation of the picture at a previous and/or future time. "Locally" implies that the amplitude and direction of the displacement are not the same everywhere in the picture.

The MPEG-2 standard further specifies predictive and interpolative interframe encoding and frequency domain intraframe encoding. It has block-based motion compensation for the reduction of temporal redundancy and discrete cosine transform based compression for the reduction of spatial redundancy. Under MPEG-2, motion compensation is achieved by predictive coding, interpolative coding, and variable length coded motion vectors. The information relative to motion is based on a 16×16 array of pixels and is transmitted with the spatial information. It is compressed with variable length codes, such as Huffman codes.

The ISO MPEG-2 compression standard specifies only the syntax of bitstream and semantics of the decoding process. The choice of coding parameters and trade-offs in performance versus complexity are left to the encoder developers.

DISCLOSURE OF THE INVENTION

In an MPEG-2 video compression system, it is desirable to achieve a highest possible video quality at a lowest possible compressed output bit rate. One method to help achieve this is to eliminate or substantially reduce any inherent "noise" in the incoming uncompressed video signal. Noise that is present in the input video signal can manifest itself as a distortion of the digitized luminance and chrominance input pixel values. This can create irregular patterns of digital values (i.e., an "unsmoothness" or "irregularity") in the input pixel data. Irregular or noisy digitized pixel values make it difficult for an video encoder to perform optimal compression, especially at low bit rates. This is because MPEG compression, or any data compression scheme, depends on a high degree of correlation in the incoming data stream to establish redundancies (both spatially and temporally in the case of MPEG).

The more correlated the data, the greater the redundancies, and thus the higher the compression capability. The less correlated the data, the less redundancies exist, and thus, the more difficult it is to compress. Eliminating noise in the incoming video signal creates a "smoothness" to the picture, as well as enhancing compression. This characteristic is especially significant when scaling the input video from standard full resolution, to a fraction of its original image size. A re-sized picture image will appear smoother and will compress better when noise filtering is performed during the scaling process.

Briefly summarized, the present invention thus comprises in one aspect a method of filtering pixels of video frames of a plurality of video frames, e.g., for enhancing video encoding thereof. The method includes obtaining pixel values of video frames of a plurality of video frames; and programmably, spatially horizontally filtering the pixel values of the video frames.

In enhanced aspects, the horizontally filtering includes programmably noise filtering or noise filtering and image scaling the pixel values of the video frames. The horizontally filtering can further include obtaining filter coefficients for use in filtering, wherein the obtaining might include dynamically changing and/or switching filter coefficients during the filtering process.

In another aspect, a method of processing pixels of video frames is provided. This method includes filtering pixel values of at least one video frame; and controlling the filtering so as to selectively perform spatial noise reduction or spatial noise reduction and image scaling on the pixel values of the at least one video frame.

Systems and computer program products corresponding to the above-summarized methods are also described and claimed herein.

To restate, provided herein is a technique for programmably horizontally filtering pixel values of frames of a sequence of motion video frames in real time. The technique is in part programmable since the coefficients employed in the filtering process are programmable and may be dynamically changed and/or switched by a user during the filtering process. For example, one or more sets of the coefficients could be changed or switched by a user on a per picture basis if desired. Such an embodiment would allow a user to improve picture quality dynamically using pre-loaded or user inputted sets of coefficients.

In one embodiment, an integrated horizontal filter/image scaler device is presented which is integrated into the front end of a video compression engine (e.g., within a digital video input interface thereof). This filter/scaler is advantageous in that it can perform operations in "real time" (for example, 30 frames/sec for NTSC video standard input). The device does not require large amounts of input pixel data buffering, since filtering/scaling can be performed on groups of input pixels "on the fly", as the video image is scanned in horizontally, line by line. The filter/scaler device adds no extra latency to the input picture processing of the video encoding engine.

Another advantage is that the filter/scaler device has an ability to "program in" filter coefficients from multiple filters when the encoding system is initially powered on. With multiple filters loaded and resident in the device, a user can then switch between filter and scaler options, for example, on input picture (frame) boundaries. This can be desirable since a user may want to account for scene changes in the video source, or to account for new video sequences in the source, e.g., caused by on the fly input video source switching. A further advantage to using a filter/scaler device as described herein is that new filter coefficients can be loaded dynamically (i.e., on the fly) while the filter system is busy filtering, with another filter set already in use. This new set of filter coefficients (i.e., the newly loaded coefficients) can then be switched in at an input frame boundary as noted above.

In addition, the horizontal filter mechanism disclosed herein is programmable to perform noise removal only, or noise removal in combination with horizontal image resizing. When employed for image resizing, multiple filter phases are applied to the groups of pixels being filtered.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 12 depicts one embodiment of horizontal spatial noise reduction filtering for luminance data only, in accordance with an aspect of the present invention.

FIG. 13 illustrates one embodiment of horizontal noise reduction filtering and image scaling for luminance data only, in accordance with an aspect of the present invention.

BEST MODE FOR CARRYING OUT THE INVENTION

Figure 1:
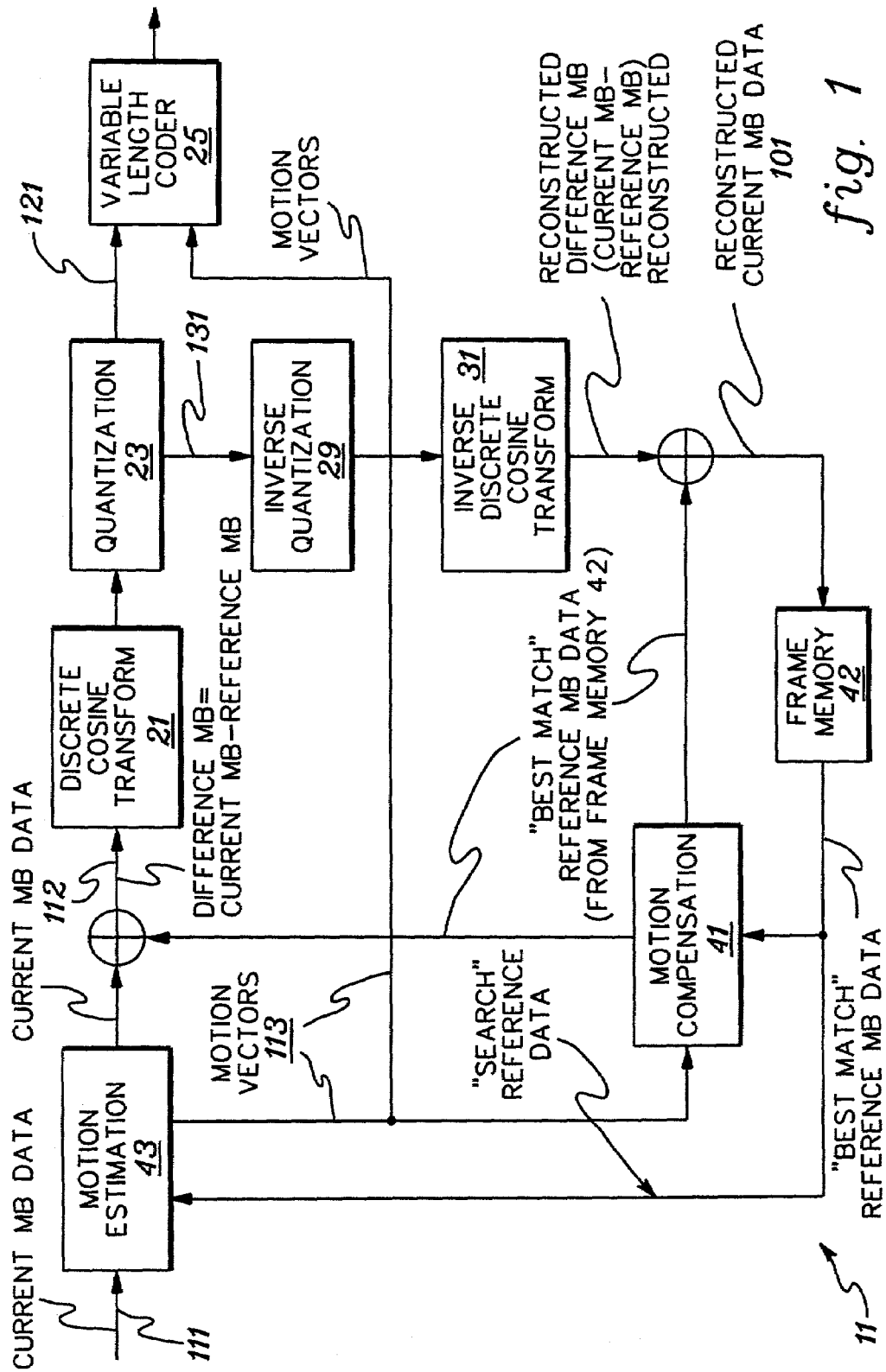
FIG. 1 shows a flow diagram of a generalized MPEG-2 compliant encoder 11, including a discrete cosine transformer 21, a quantizer 23, a variable length coder 25, an inverse quantizer 29, an inverse discrete cosine transformer 31, motion compensation 41, frame memory 42, and motion estimation 43. The data paths include the $i^{th}$ picture input 111, difference data 112, motion vectors 113 (to motion compensation 41 and to variable length coder 25), the picture output 121, the feedback picture for motion estimation and compensation 131, and the motion compensated picture 101. This figure has the assumptions that the $i^{th}$ picture exists in frame memory or frame store 42 and that the $i+1^{th}$ is being encoded with motion estimation.

The invention relates, for example, to MPEG compliant encoders and encoding processes such as described in "Information Technology-Generic coding of moving pictures and associated audio information: Video," Recommendation ITU-T H.262, ISO/IEC 13818-2, International Standard, 1996. The encoding functions performed by the encoder include data input, spatial compression, motion estimation, macroblock type generation, data reconstruction, entropy coding, and data output. Spatial compression includes discrete cosine transformation (DCT), quantization, and entropy encoding. Temporal compression includes intensive reconstructive processing, such as inverse discrete cosine transformation, inverse quantization, and motion compensation. Motion estimation and compensation are used for temporal compression functions. Spatial and temporal compression are repetitive functions with high computational requirements.

More particularly the invention relates, for example, to a process for performing spatial and temporal compression including discrete cosine transformation, quantization, entropy encoding, motion estimation, motion compensation, and prediction, and even more particularly to a system for accomplishing spatial and temporal compression.

The first compression step is the elimination of spatial redundancy, for example, the elimination of spatial redundancy in an "I" frame picture. Spatial redundancy is the redundancy within a picture. The MPEG-2 Standard uses a block based method of reducing spatial redundancy. The method of choice is the discrete cosine transformation, and discrete cosine transform coding of the picture. Discrete cosine transform coding is combined with weighted scalar quantization and run length coding to achieve a desirable compression.

The discrete cosine transformation is an orthogonal transformation. Orthogonal transformations, because they have a frequency domain interpretation, are filter bank oriented. The discrete cosine transformation is also localized. That is, the encoding process samples on an 8×8 spatial window which is sufficient to compute 64 transform coefficients or sub-bands.

Another advantage of the discrete cosine transformation is that fast encoding and decoding algorithms are available. Additionally, the sub-band decomposition of the discrete cosine transformation is sufficiently well behaved to allow effective use of psychovisual criteria.

After transformation, many of the frequency coefficients are zero, especially the coefficients for high spatial frequencies. These coefficients are organized into a zig-zag or alternate-scanned pattern, and converted into run-amplitude (run-level) pairs. Each pair indicates the number of zero coefficients and the amplitude of the nonzero coefficient. This is coded in a variable length code.

Motion compensation is used to reduce or even eliminate redundancy between pictures. Motion compensation exploits temporal redundancy by dividing the current picture into blocks, for example, macroblocks, and then searching in previously transmitted pictures for a nearby block with similar content. Only the difference between the current block pels and-the predicted block pels extracted from the reference picture is actually compressed for transmission and thereafter transmitted.

One method of motion compensation and prediction is to record the luminance and chrominance, i.e., intensity and color, of every pixel in an "I" picture, then record changes of luminance and chrominance, i.e., intensity and color for every specific pixel in the subsequent picture. However, this is uneconomical in transmission medium bandwidth, memory, processor capacity, and processing time because objects move between pictures, that is, pixel contents move from one location in one picture to a different location in a subsequent picture. A more advanced idea is to use a previous or subsequent picture to predict where a block of pixels will be in a subsequent or previous picture or pictures, for example, with motion vectors, and to write the result as "predicted pictures" or "P" pictures. More particularly, this involves making a best estimate or prediction of where the pixels or macroblocks of pixels of the $i^{th}$ picture will be in the $i-1^{th}$ or $i+1^{th}$ picture. It is one step further to use both subsequent and previous pictures to predict where a block of pixels will be in an intermediate or "B" picture.

To be noted is that the picture encoding order and the picture transmission order do not necessarily match the picture display order. See FIG. 2. For I-P-B systems the input picture transmission order is different from the encoding order, and the input pictures must be temporarily stored until used for encoding. A buffer stores this input until it is used.

For purposes of illustration, a generalized flowchart of MPEG compliant encoding is shown in FIG. 1. In the flowchart, the images of the $i^{th}$ picture and the $i+1^{th}$ picture are processed to generate motion vectors. The motion vectors predict where a macroblock of pixels will be in a prior and/or subsequent picture. The use of the motion vectors is a key aspect of temporal compression in the MPEG standard. As shown in FIG. 1 the motion vectors, once generated, are used for the translation of the macroblocks of pixels, from the $i^{th}$ picture to the $i+1^{th}$ picture.

As shown in FIG. 1, in the encoding process, the images of the $i^{th}$ picture and the $i+1^{th}$ picture are processed in the encoder 11 to generate motion vectors which are the form in which, for example, the $i+1^{th}$ and subsequent pictures are encoded and transmitted. An input image 111 of a subsequent picture goes to the motion estimation unit 43 of the encoder. Motion vectors 113 are formed as the output of the motion estimation unit 43. These vectors are used by the motion compensation unit 41 to retrieve macroblock data from previous and/or future pictures, referred to as "reference" data, for output by this unit. One output of the motion compensation unit 41 is negatively summed with the output from the motion estimation unit 43 and goes to the input of the discrete cosine transformer 21. The output of the discrete cosine transformer 21 is quantized in a quantizer 23. The output of the quantizer 23 is split into two outputs, 121 and 131; one output 121 goes to a downstream element 25 for further compression and processing before transmission, such as to a run length encoder; the other output 131 goes through reconstruction of the encoded macroblock of pixels for storage in frame memory 42. In the encoder shown for purposes of illustration, this second output 131 goes through an inverse quantization 29 and an inverse discrete cosine transform 31 to return a lossy version of the difference macroblock. This data is summed with the output of the motion compensation unit 41 and returns a lossy version of the original picture to the frame memory 42.

Figure 2:
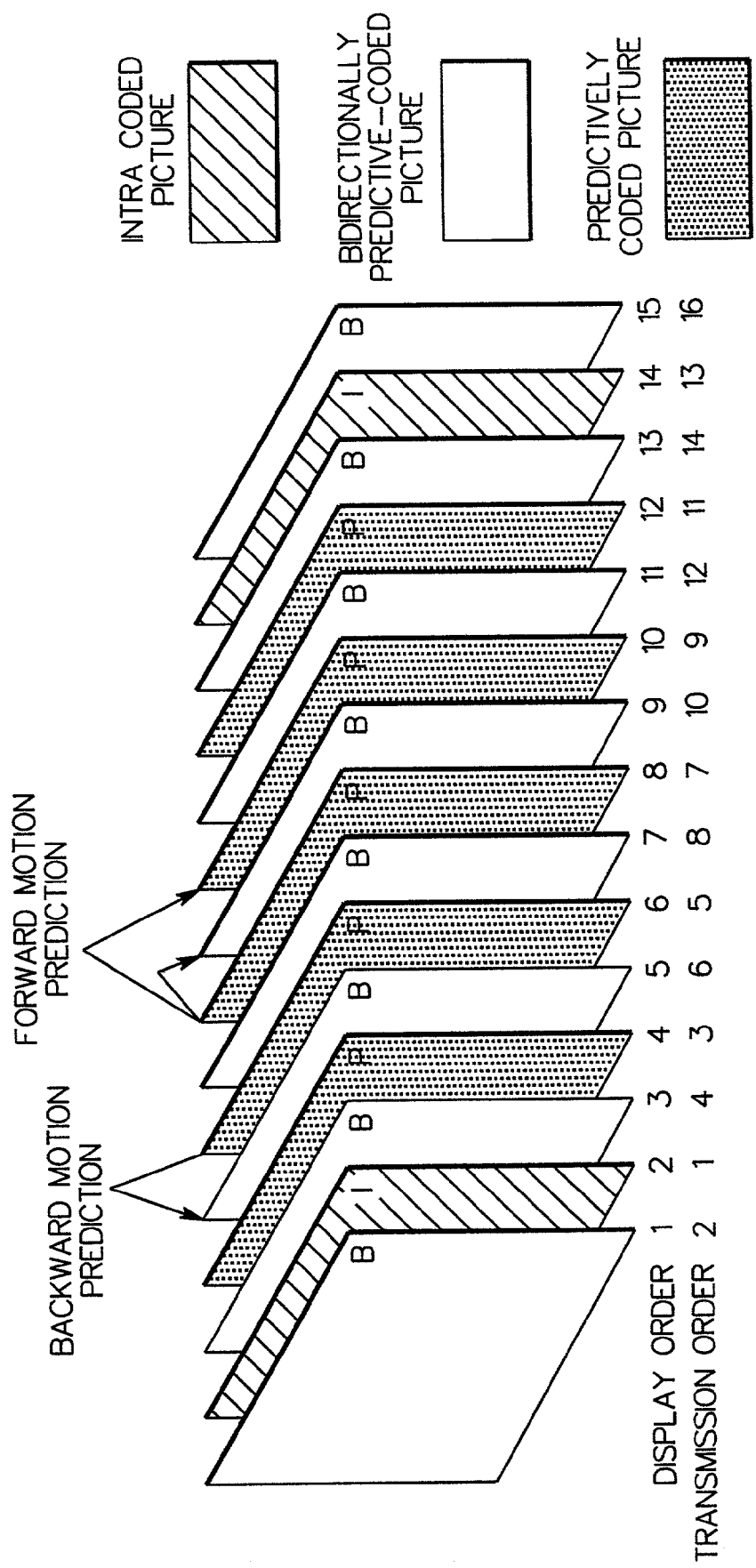
FIG. 2 illustrates the I, P, and B pictures, examples of their display and transmission orders, and forward, and backward motion prediction.

As shown in FIG. 2, there are three types of pictures. There are "Intra pictures" or "I" pictures which are encoded and transmitted whole, and do not require motion vectors to be defined. These "I" pictures serve as a reference image for motion estimation. There are "Predicted pictures" or "P" pictures which are formed by motion vectors from a previous picture and can serve as a reference image for motion estimation for further pictures. Finally, there are "Bidirectional pictures" or "B" pictures which are formed using motion vectors from two other pictures, one past and one future, and can not serve as a reference image for motion estimation. Motion vectors are generated from "I" and "P" pictures, and are used to form "P" and "B" pictures.

Figure 3:
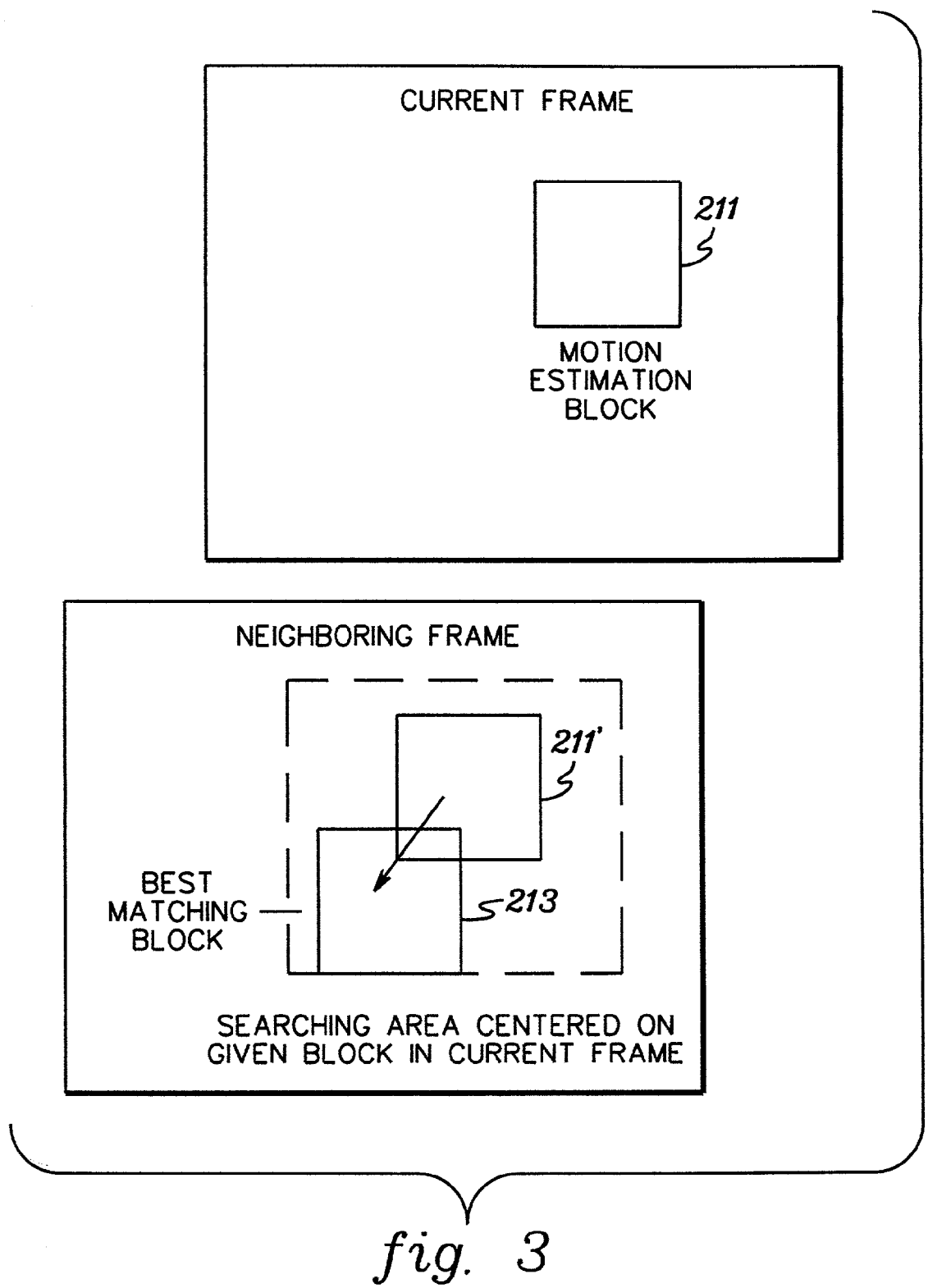
FIG. 3 illustrates the search from the motion estimation block in the current frame or picture to the best matching block in a subsequent or previous frame or picture. Elements 211 and 211' represent the same location in both pictures.
Figure 4:
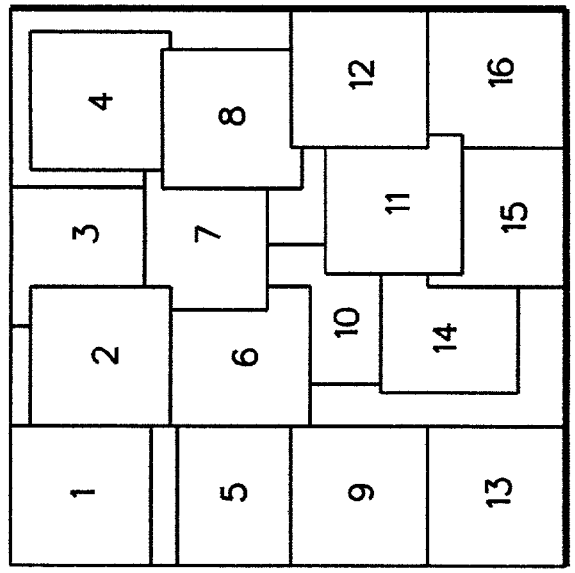
FIG. 4 illustrates the movement of blocks in accordance with the motion vectors from their position in a previous picture to a new picture, and the previous picture's blocks adjusted after using motion vectors.

One method by which motion estimation is carried out, shown in FIG. 3, is by a search from a macroblock 211 of an $i^{th}$ picture throughout a region of the next picture to find the best match macroblock 213. Translating the macroblocks in this way yields a pattern of macroblocks for the $i+1^{th}$ picture, as shown in FIG. 4. In this way the $i^{th}$ picture is changed a small amount, e.g., by motion vectors and difference data, to generate the $i+1^{th}$ picture. What is encoded are the motion vectors and difference data, and not the $i+1^{th}$ picture itself. Motion vectors translate position of an image from picture to picture, while difference data carries changes in chrominance, luminance, and saturation, that is, changes in shading and illumination.

Returning to FIG. 3, processing searches for a good match by starting from the same location in the $i^{th}$ picture as in the $i+1^{th}$ picture. A search window is created in the $i^{th}$ picture. We search for a best match within this search window. Once found, the best match motion vectors for the macroblock are coded. The coding of the best match macroblock includes a motion vector, that is, how many pixels in the y direction and how many pixels in the x direction is the best match displaced in the next picture. Also encoded is difference data, also referred to as the "prediction error", which is the difference in chrominance and luminance between the current macroblock and the best match reference macroblock.

The operational functions of an MPEG-2 encoder are discussed in further detail in U.S. Pat. No. 6,118,823 by Carr et al., entitled "Control Scheme For Shared-Use Dual-Port Predicted Error Array," which is hereby incorporated herein by reference in its entirety.

As noted above, horizontal filtering can be employed to soften pictures to an encode process, and thereby enhance data compression. A softened picture is one whose pixel values have been smoothed by such a function, allowing the encode process to proceed easier and the output to be more visually appealing. Further, a resized picture image will appear smoother and will compress more optimally when noise filtering is performed during the scaling process.

Presented below are certain horizontal filter implementations in accordance with aspects of the present invention.

In one aspect, a horizontal filter is provided herein which employs both luminance coefficients and chrominance coefficients to dynamically perform horizontal noise reduction filtering, or horizontal noise reduction filtering in combination with image scaling. In one embodiment, this horizontal filter may be implemented on-chip (e.g., comprise hardware integrated onto a digital video encoder chip). This integration eliminates any need for a user to perform external horizontal filtering and, in accordance with one embodiment of the invention, allows a user to improve picture quality dynamically by using and switching between pre-loaded sets of filter coefficients or dynamically inputted sets of luminance and chrominance filter coefficients.

Figure 5:
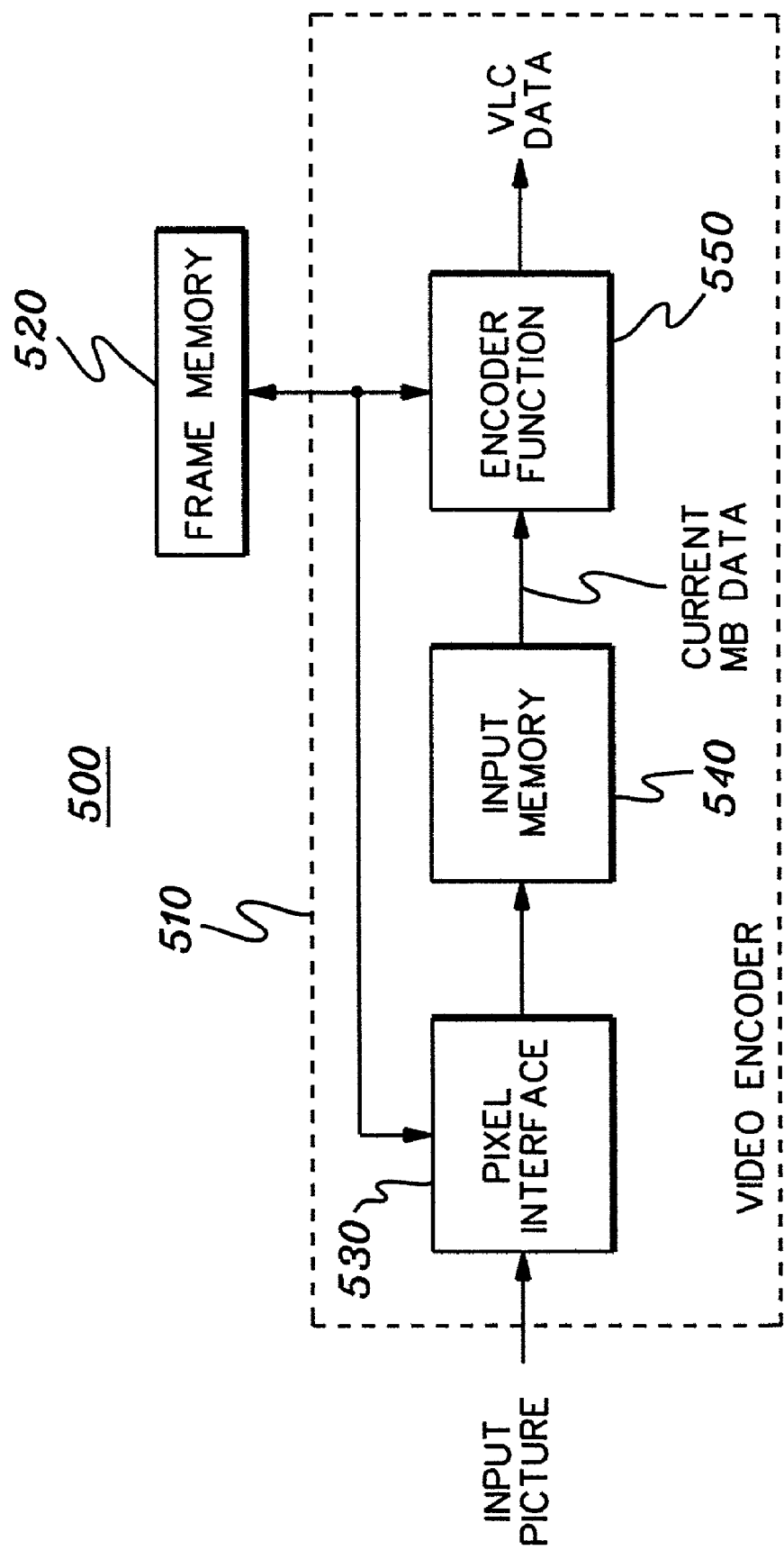
FIG. 5 illustrates one embodiment of a pixel interface integrated within a digital video encoder, in accordance with an aspect of the present invention.

One embodiment of a video encode system, generally denoted 500, in accordance with an aspect of the present invention is depicted in FIG. 5. System 500 includes a video encoder 510 and an external frame store 520. Video encoder 510 includes pixel interface logic 530 for preprocessing inputted picture data, an input memory 540 and encoder function logic 550. In one embodiment, both pixel interface 530 and encoder function 550 output data to and receive data from frame store 520. The current macroblock data fed into encoder function 550 is output from function 550 as variable length coded data as discussed above.

Figure 6:
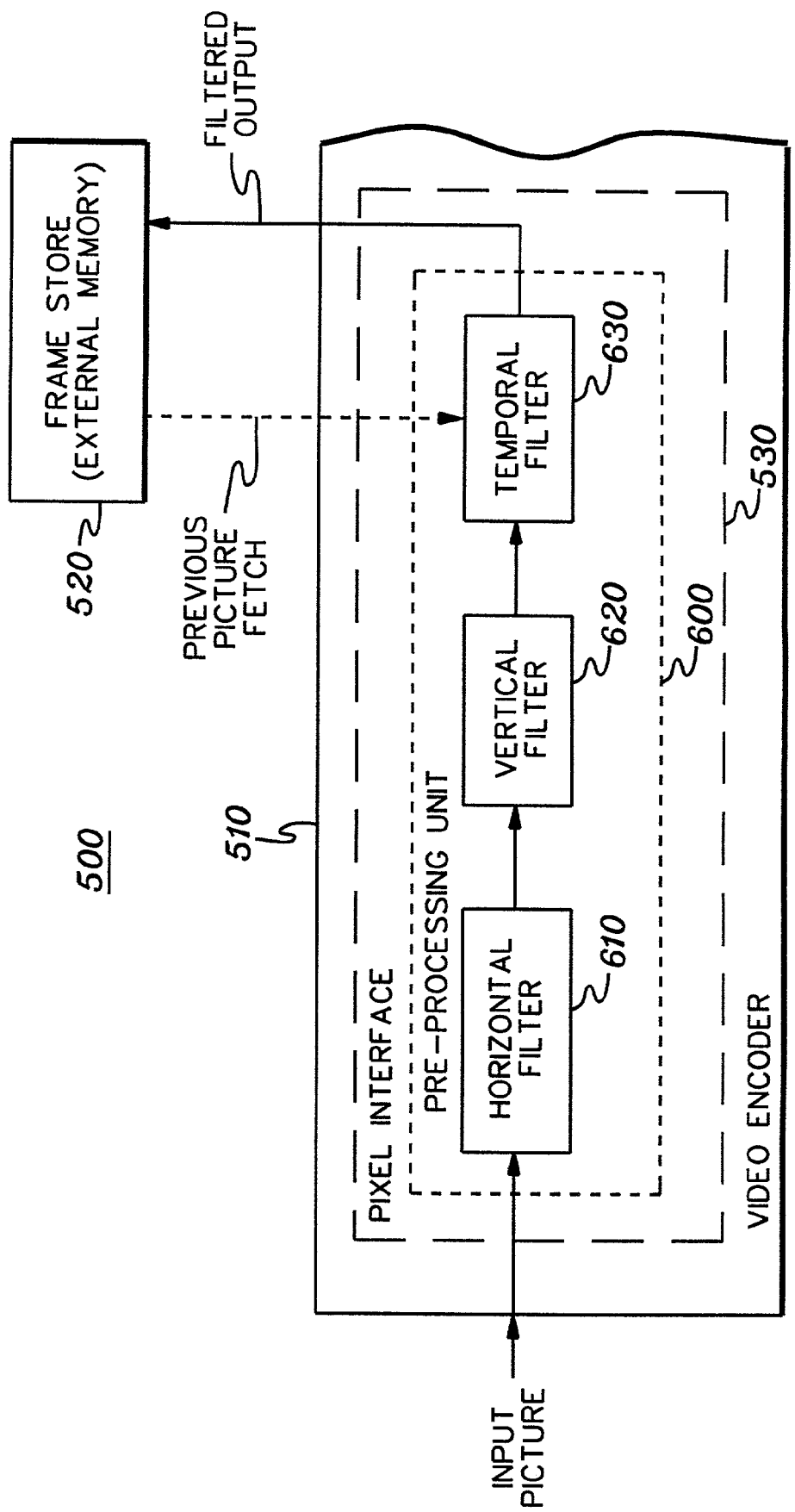
FIG. 6 depicts in greater detail one embodiment of the pixel interface of FIG. 5, in accordance with an aspect of the present invention.

One embodiment of pixel interface 530 for video encoder 510 of system 500 is depicted in FIG. 6, wherein pixel interface 530 is shown to include a pre-processing unit 600. In addition to unit 600, the pixel interface might also include pixel input logic (not shown) for receiving raw pixel data for feeding to the pre-processing unit, and an output buffer (not shown) disposed between the output of pre-processing unit 600 and, for example, input memory 540 of the encoder of FIG. 5.

As shown in FIG. 6, preprocessing unit 600 includes a horizontal filter 610, a vertical filter 620 and a temporal filter 630. Temporal filter 630 outputs filter data to and retrieves filter data from frame store 520. The retrieved filter data comprises the filtered output of a previous picture, and is used in temporal filtering the next picture. Described hereinbelow are various embodiments of a horizontal filter 610. Filters 620 & 630 are optional and are merely provided by way of illustration. An example of a vertical filter is provided in the above-incorporated patent application entitled "Programmable Vertical Filter For Video Encoding", by Ngai et al., while an example of a temporal filter is described in the above-incorporated patent application entitled "Programmable And Addaptive Temporal Filter For Video Encoding", by Murdock et al.

Note that depending upon the video source, a user may program or choose whether to horizontally filter, vertically filter, and/or temporally filter a given set of video frames. The horizontal filter and the vertical filter comprise spatial filters, while the temporal filter is a time-based filtering between frames of a video sequence. Further, although depicted in FIG. 6 as integrated within a video encoder, those skilled in the art should recognize that the horizontal filter, vertical filter and temporal filter could collectively or individually comprise preprocessing logic disposed outside of the video encoder. That is, the horizontal filter described and claimed herein could reside within the video encoder or external to the video encoder as preprocessing logic.

Figure 7:
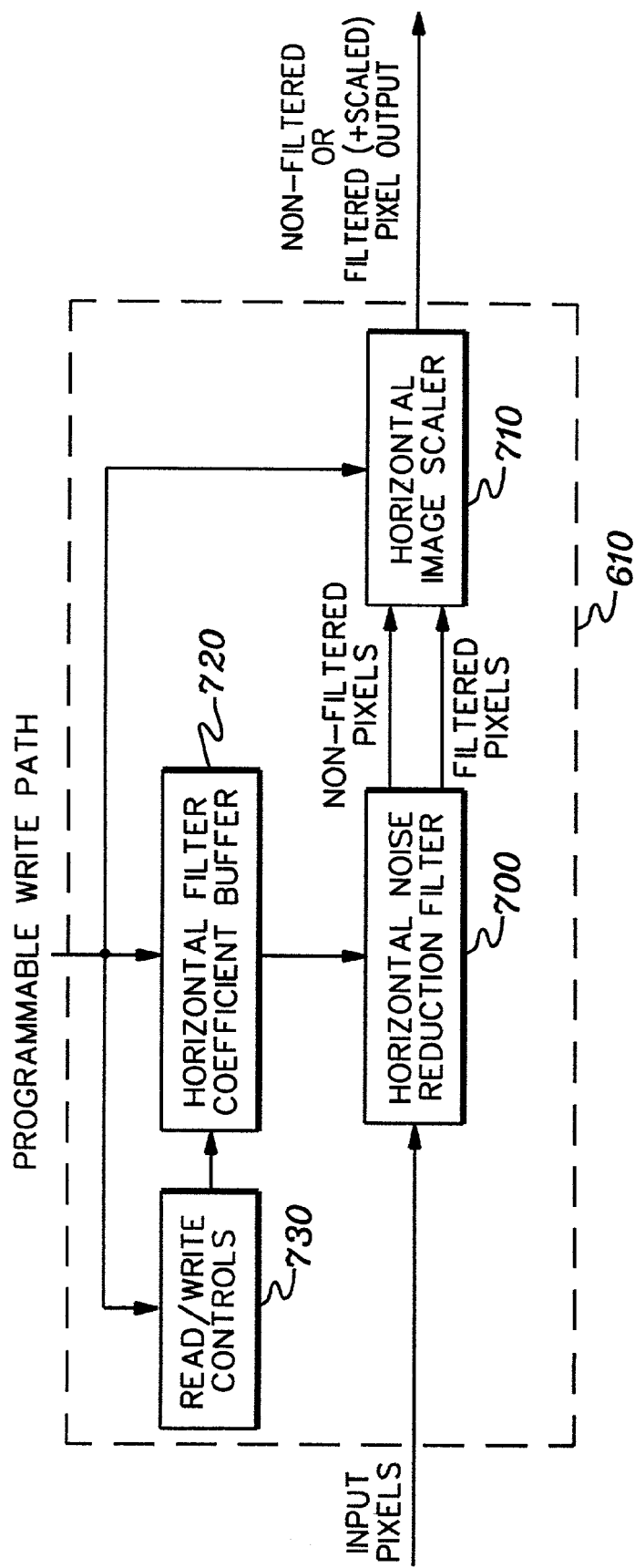
FIG. 7 illustrates in greater detail one embodiment of the horizontal filter of FIG. 6, in accordance with an aspect of the present invention.

FIG. 7 depicts one embodiment of a horizontal filter 610 in accordance with an aspect of the present invention. Horizontal filter 610 includes horizontal noise reduction filter logic 700 and horizontal image scaler logic 710. A horizontal filter coefficient buffer 720 holds multiple sets of filter coefficients, while read/write control 730 controls the reading of filter coefficients from buffer 720 and the writing of filter coefficients to buffer 720. A programmable write path is provided to read/write control 730, buffer 720 and horizontal image scaler 710 for programmable control of the horizontal filter in accordance with certain aspects of the present invention.

For example, the programmable write path signal, which can be generated by an external user or by internal code, can control the horizontal filter for noise reduction filtering only of input pixels, or noise reduction filtering of input pixels combined with horizontal image scaling thereof, or even no filtering (in which case the non-filtered pixels are simply passed through filter 610). Further, this programmable write path could be employed, for example, by a user to load different filter coefficients into buffer 720 for subsequent use by the noise reduction filter 700. In accordance with the present invention, filter coefficients for noise reduction could be adjusted on a per picture basis, if desired. For example, should the video source change to a more noisy input, it might be desirable to dynamically switch the filter coefficients to increase the noise filtering. One embodiment of horizontal noise reduction filter 700 is depicted in FIG. 8, while an embodiment of horizontal image scaler 710 is depicted in FIG. 9.

Figure 8:
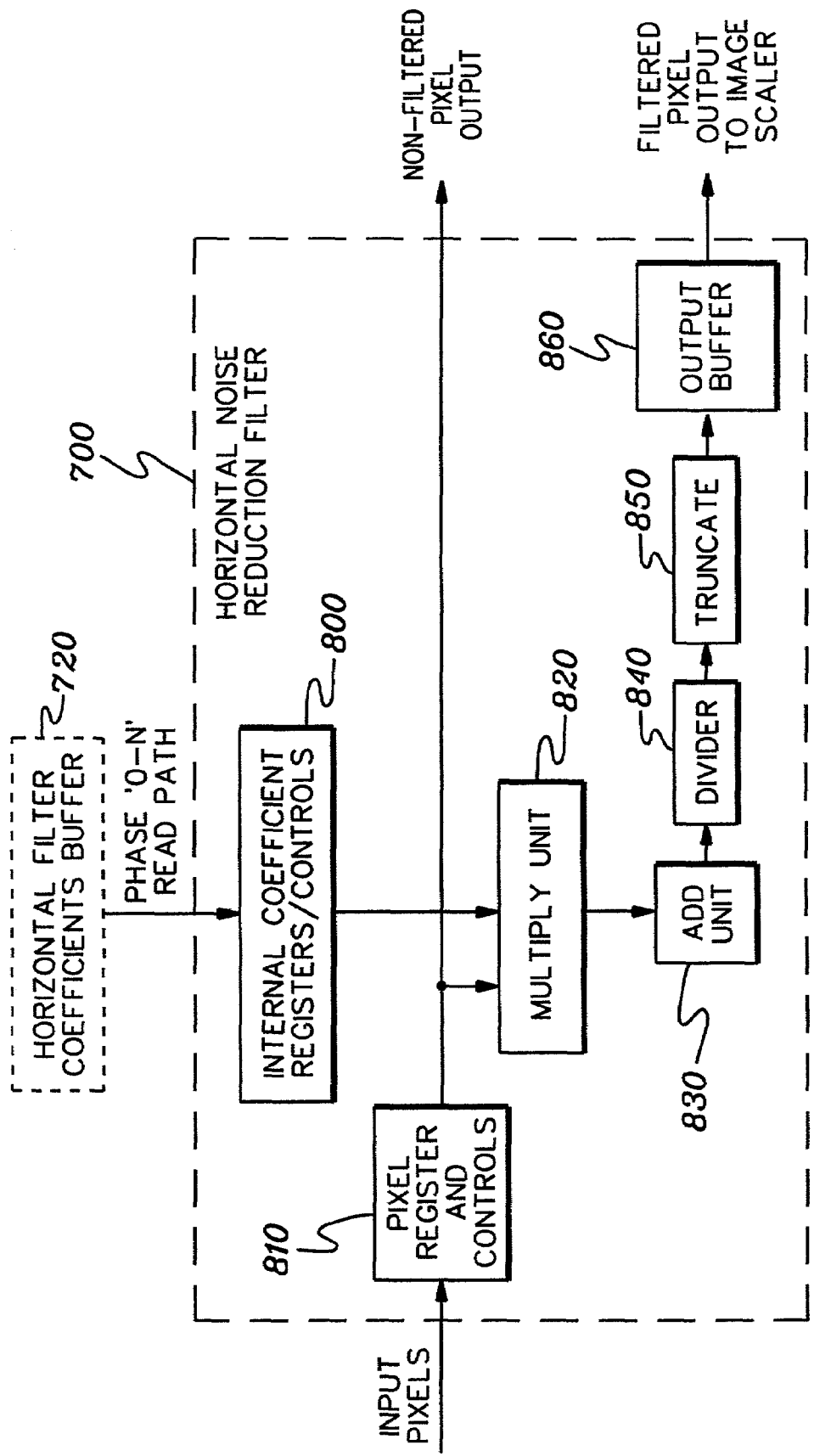
FIG. 8 depicts one embodiment of the horizontal noise reduction filter of FIG. 7, in accordance with an aspect of the present invention.

As shown in FIG. 8, the filter coefficients from buffer 720 are held in internal coefficient registers/controls logic 800 for use by the horizontal noise reduction filter 700. In accordance with an aspect of the present invention, these filter coefficients can be dynamically switched during the filtering process such that (if desired) a different set of filter coefficients could be employed with each new video frame undergoing noise filtering.

The input pixel data is initially received in a pixel register and control logic 810. Assuming that filtering is enabled, a desired number of horizontal pixels, for example, 8 in the case of luminance data, and 4 in the case of Cb and Cr chrominance data, are obtained and multiplied by a respective filter coefficient within multiply unit 820. If filtering is not enabled, then the input pixels are simply passed through filter 700 and output as non-filtered pixels. If filtering, the products from multiply unit 820 are summed by add unit 830, and divided by, for example, 256 in a divide/shift unit 840. Bit truncation 850 is next performed to yield a final 8 bit pixel result. The result is placed in output buffer 860 for forwarding to horizontal image scaler 710 as filtered pixel output.

Figure 9:
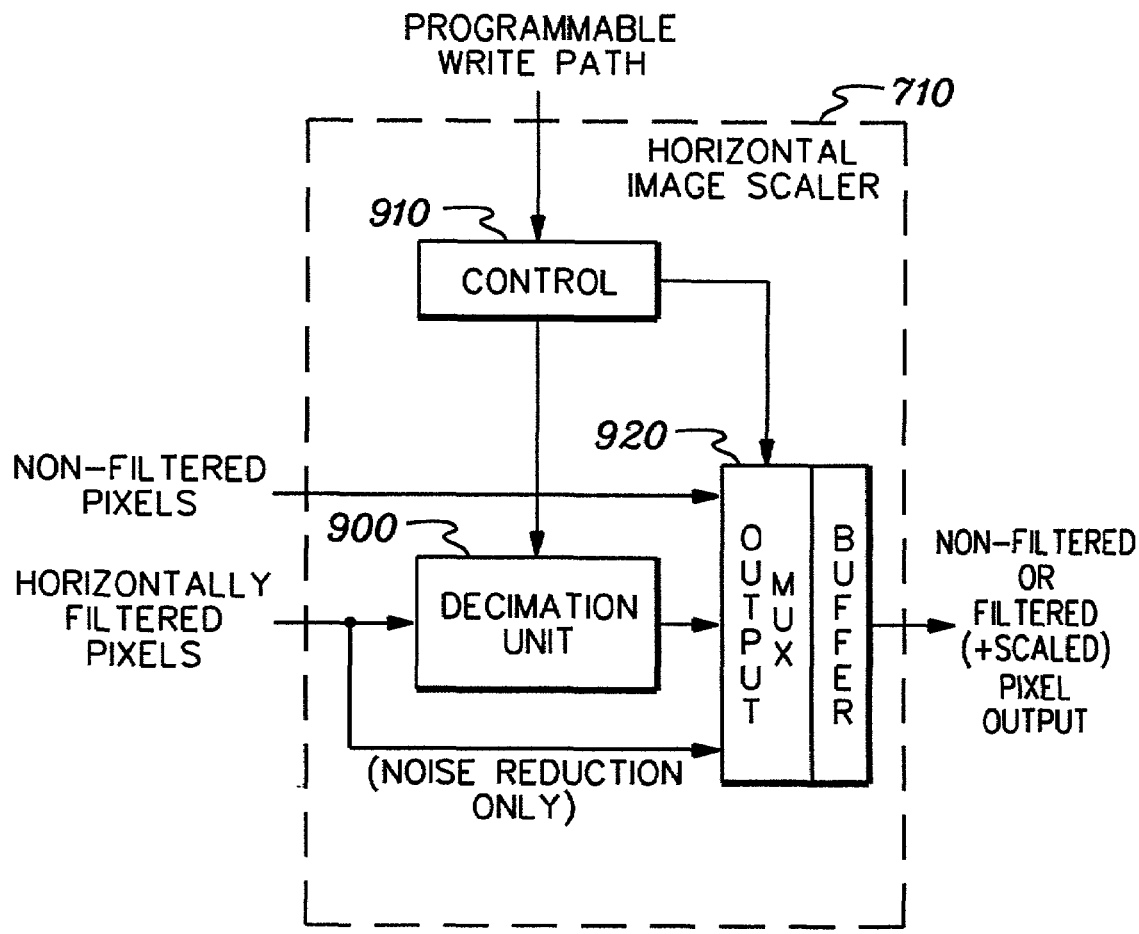
FIG. 9 depicts one embodiment of the horizontal image scaler of FIG. 7, in accordance with an aspect of the present invention.

FIG. 9 depicts one embodiment of a horizontal image scaler in accordance with the principles of the present invention. Image scaler 710 receives non-filtered pixels or noise reduced pixels from, for example, horizontal noise reduction filter 700, such as depicted in FIG. 8. If non-filtered pixels are received, then the pixels are forwarded directly to an output multiplexer/buffer 920 for output as non-filtered pixels. If noise filtering only, then the filtered pixels are passed directly to output multiplexer/buffer 920. Otherwise, when image scaling, the filtered pixels are passed through a decimation unit 900, which is controlled by control logic 910. Control logic 910 receives input signals via the programmable write path. Output of decimation unit 900 is fed to output multiplexer/buffer 920 for forwarding to subsequent processing logic as described above.

Decimation unit 900 decimates the filtered pixels in accordance with programmed control signals. That is, the filtered pixels undergo image scaling in accordance with one of multiple possible resizing functions programmed into the image scaler, as explained further below. Decimation unit 900 essentially drops filtered pixels passing through the image scaler in accordance with a predefined cadence as defined by controls 910.

Additionally, in accordance with an aspect of the present invention, multiple phases are employed when noise filtering pixels to undergo image scaling. These phases, labeled "0-N" in FIG. 8, comprise different sets of filter coefficients, which are employed against the pixels of a group of spatially horizontal pixels being filtered. This use of filter phases, or different sets of filter coefficients, is also explained further below.

Figure 10:
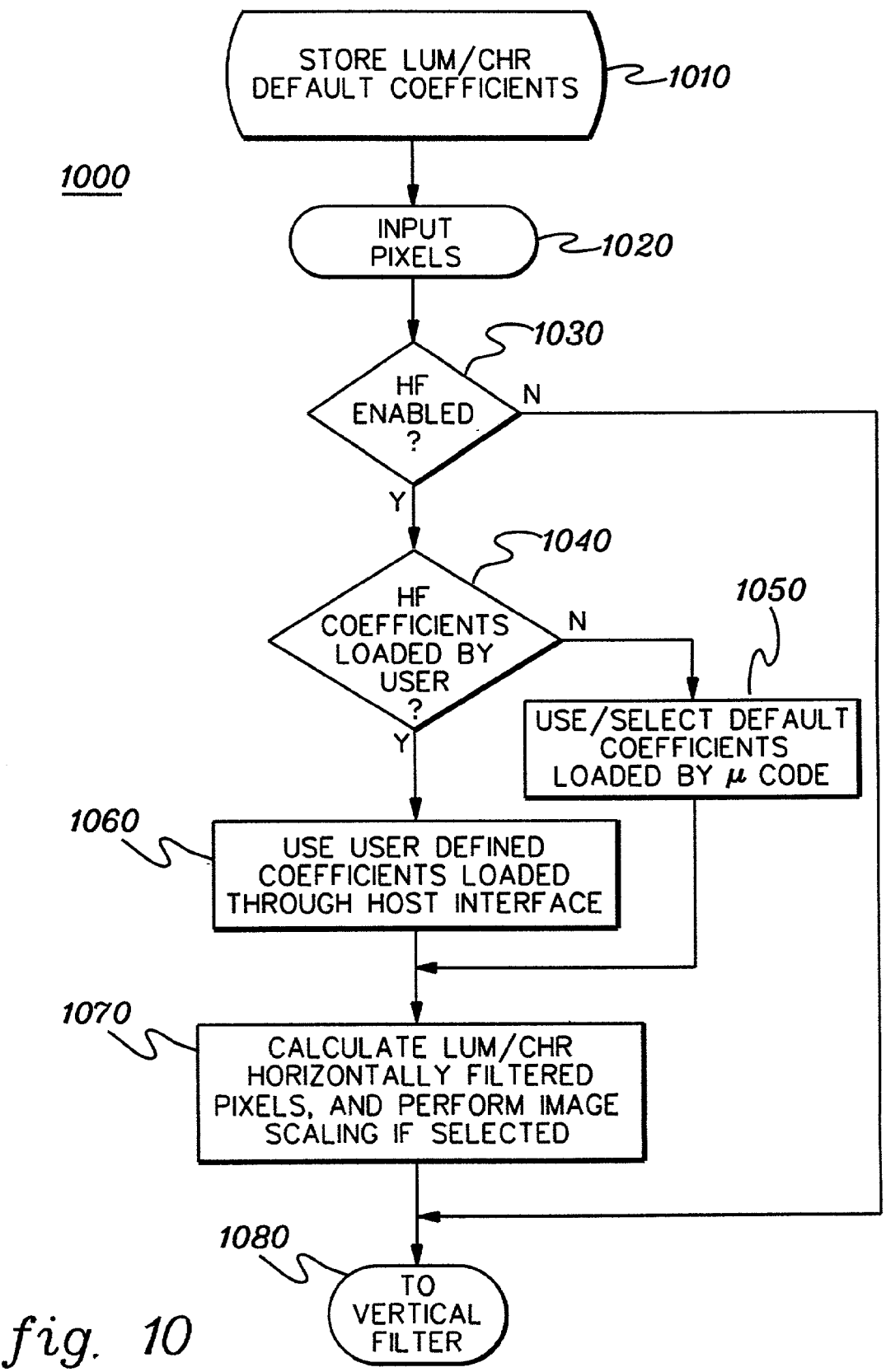
FIG. 10 illustrates one embodiment of a process for programmably horizontally filtering pixel values, in accordance with an aspect of the present invention.

FIG. 10 depicts one flowchart embodiment of a horizontal filter process 1000 in accordance with the present invention. Process 1000 assumes that luminance default coefficients and chrominance default coefficients are stored 1010, for example, in a horizontal filter coefficients buffer. Upon receipt of an input picture, processing determines whether horizontal filtering is enabled 1030. If "no", then the received pixel values are simply forwarded to subsequent logic, such as a vertical filter 1080.

Assuming that horizontal filtering is enabled, processing determines whether horizontal filter coefficients have been loaded by a user 1040. If "no", then default coefficients are employed/selected 1050. Otherwise, the user defined coefficients, e.g., loaded through a host interface, are used in the horizontal filter logic. The horizontally filtered luminance and chrominance pixel values are then calculated 1070, using either the user defined set of filter coefficients or a default set of filter coefficients. Once calculated, the filtered pixel values are forwarded, in one embodiment, to the vertical filter 1080.

Note that in one embodiment, the default filter coefficients could comprise multiple sets of default coefficients preloaded into registers as described herein. In such an example, a user system could select among the sets of filter coefficients (e.g., on a per picture basis), or alternatively, could load through the host interface customized luminance and chrominance filter coefficients for use in the horizontal filtering process.

Further details of a horizontal noise filter/image scaler in accordance with aspects of the present invention are discussed below in connection with FIGS. 11–13.

Figure 11:
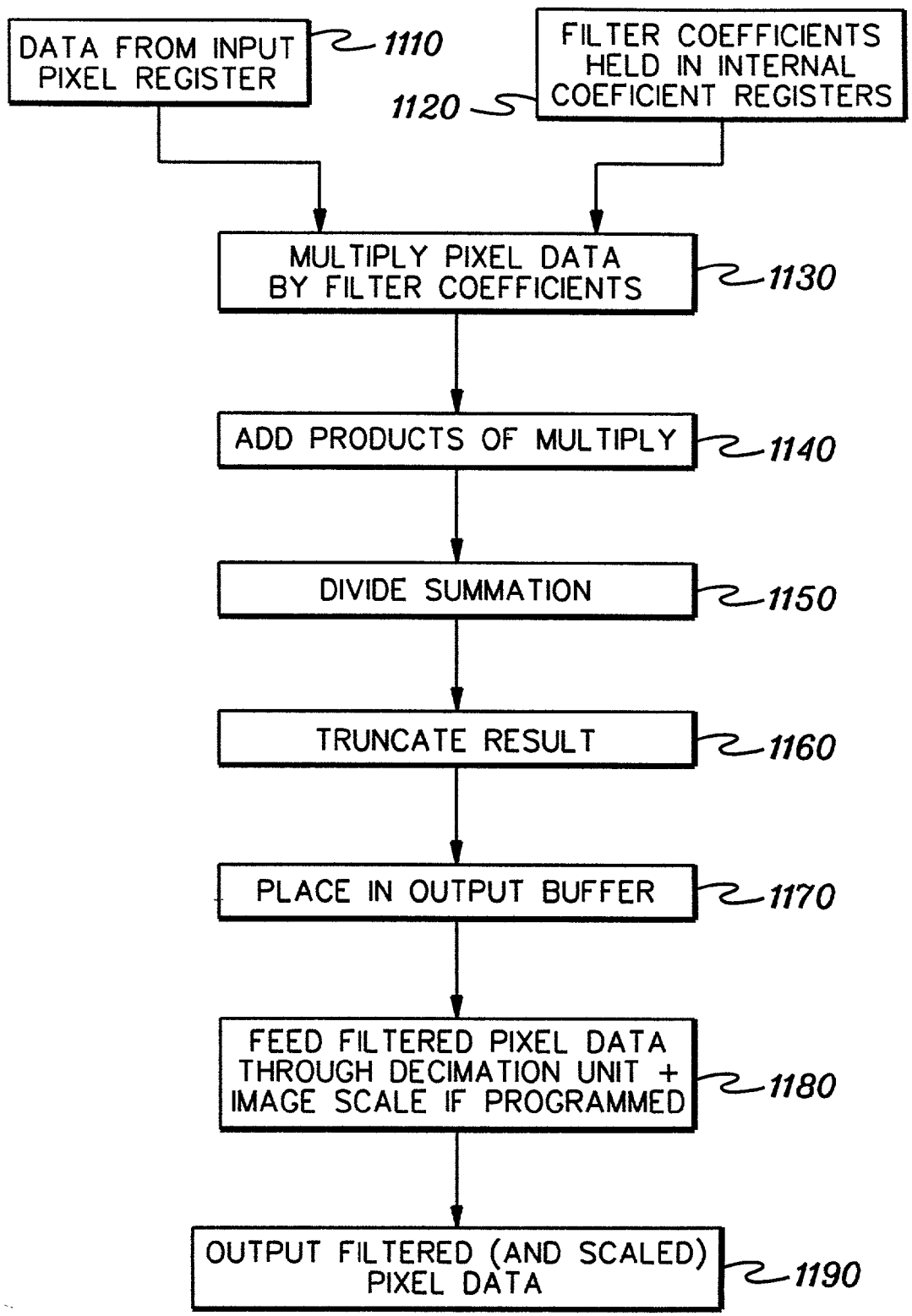
FIG. 11 illustrates one embodiment of a process for calculating luminance & chrominance horizontally filtered pixels and for performing image scaling, in accordance with an aspect of the present invention.

Referring to the filter/scaler processing embodiment of FIG. 11, as an input video image is scanned in horizontally, a group of 8 luminance pixels and four each Cb and Cr chrominance pixels is formed, i.e., in one example. This data is held in an input pixel register 1110. Each pixel within the group, is then multiplied 1130 by a corresponding filter coefficient (or filter tap) programmed in (in one embodiment) at power on/initialization time. These filter coefficients are held in the internal coefficient registers of the horizontal noise reduction filter 1120.

More particularly, the 8 luminance pixels in a group of pixels are multiplied by 8 luminance filter coefficients and the 4 Cb and 4 Cr chrominance pixels are each multiplied by the 4 chrominance filter coefficients. The luminance and chrominance filter coefficients are distinct, that is, there is one coefficient filter for luminance values, and another separate filter for chrominance values. In one embodiment, the filter coefficients are 9 bit signed values.

The signed results of the multiplication process are then summed 1140, and divided by a normalized value 1150. By way of example, the normalized value might comprise 256. Since 256 is assumed to be the normalized value, the sum of the programmable filter coefficients will be 256 as well. A bit truncation and saturation 1160 is performed to yield a final 8 bit pixel result; that is, a negative pixel value is capped as a zero value, while a value greater than 255 is capped at 255. These new filtered luminance and chrominance pixel values then represent the first luminance and chrominance pixel values in the line. The filtered pixel values are placed in an output buffer 1170 of the noise reduction filter, as described above.

To generate the next filtered luminance and chrominance pixel values, a new group of 8/4 original luminance/chrominance pixel values is formed by shifting one original pixel value to the right. For example, original pixels 1–8 might form one group, while original pixels 2–9 form a next group, and so on.

In actuality, at the beginning of a line, certain pixels are repeated. For example reference FIG. 12, which depicts an example of noise reduction only for luminance components of the pixel values. In this example, the first groups of 8 luminance components comprise P1P1P1P1P2P3P4P5, P1P1P1P2P3P4P5P6, P1P1P2P3P4P5P6P7, P1P2P3P4P5P6P7P8, P2P3P4P5P6P7P8P9, etc. Similarly, certain original pixels would be repeated at the end of a line to form the final 4 original pixel groups at the end of the line. This will insure that the final number of filtered pixels matches the original horizontal size of the video image.

After shifting to the right by one original pixel value, the entire process of multiplication, summing the results, dividing by 256, and truncation and saturation, is repeated. Thus, the next filtered luminance and chrominance pixel value is obtained. This process is repeated across an entire line to form a new horizontal line of filtered luminance and chrominance pixel values. It is these filtered values that are delivered downstream to the MPEG-2 video encoding engine for compression.

As further shown in FIG. 11, in one embodiment, the filtered pixel values could optionally be fed through an image scaler for decimation 1180. For horizontal scaling of the filtered pixel values, the same process as described above is performed, except for the following differences.

Each filtered luminance and chrominance pixel is created by applying separate "phases" of a programmable set of filter coefficients to each group of 8/4 original luminance/chrominance pixels (again, assuming scaling is to be performed). As used herein, a phase refers to a distinct and separate group of filter coefficients or taps. A filter used for scaling could include one or more phases, with each phase having 8 luminance filter coefficients and 4 chrominance filter coefficients. For example, phase one of a filter might be applied against a first group of original luminance/chrominance pixels, while phase two of a filter would be applied against a second group of original pixels, phase 3 applied to a third group, and so on, until the total number of phases in the filter has been cycled through.

Once this has occurred, one or more filtered pixels are "dropped", and the filter phase is cycled back to the beginning of the filter in use (i.e., back to phase one). For example, for an image scaling option of 3/4 resizing, the following operation occurs: phases 1, 2, and 3 of the 3/4 filter are applied against pixel groups 1, 2, and 3 of original pixels, respectively. Three filtered pixels are created from this process. Since only three phases are defined for a 3/4 filter, a fourth filtered pixel is then created, but "dropped" by the image scaling process. The phase then cycles back to phase one. At this point, a new group of three filtered pixels is created, with a forth filtered pixel being dropped as before. The pattern repeats itself to the end of the line.

As a specific illustration, a noise filter/scaler device in accordance with an aspect of the present invention might be programmed to provide multiple single phase noise filter only options (e.g., 6 or more) and multiple scaling options (e.g., 6 or more). (Alternatively, the first phase of each image scaler filter option could be used as a noise reduction only option.) As one example, the scaling options might be as follows:

Option 1: 1/2 resizing which comprises a single phase filter with every other filtered pixel being dropped.
Option 2: 2/3 resizing which includes a 2 phase filter, with one out of every three filtered pixels being dropped. FIG. 13 depicts an example for luminance data only of a 2/3 horizontal image scaler, wherein every third filtered pixel is dropped from the output.
Option 3: 3/4 resizing which includes a 3 phase filter, with one out of every four filtered pixels being dropped.
Option 4: 8/9 resizing which includes an 8 phase filter, with one out of every 9 filtered pixels being dropped.
Option 5: 3/8 resizing which includes a 3 phase filter, with 5 out of every 8 filtered pixels being dropped.
Option 6: 9/16 resizing which includes a 9 phase filter, with 7 out of every 16 filtered pixels being dropped.

For the above scaling options, a phase cadence counter may be employed, for example, as part of the internal control logic of the horizontal filter. The phase cadence counter would indicate when filtered pixels are to be dropped. As in the case of noise filtering only, when performing image scaling of filtered pixels that are not to be dropped, the filtered pixels are output 1190 (FIG. 11), for example, to an MPEG-2 encoding engine for compression.

Figure 14A:
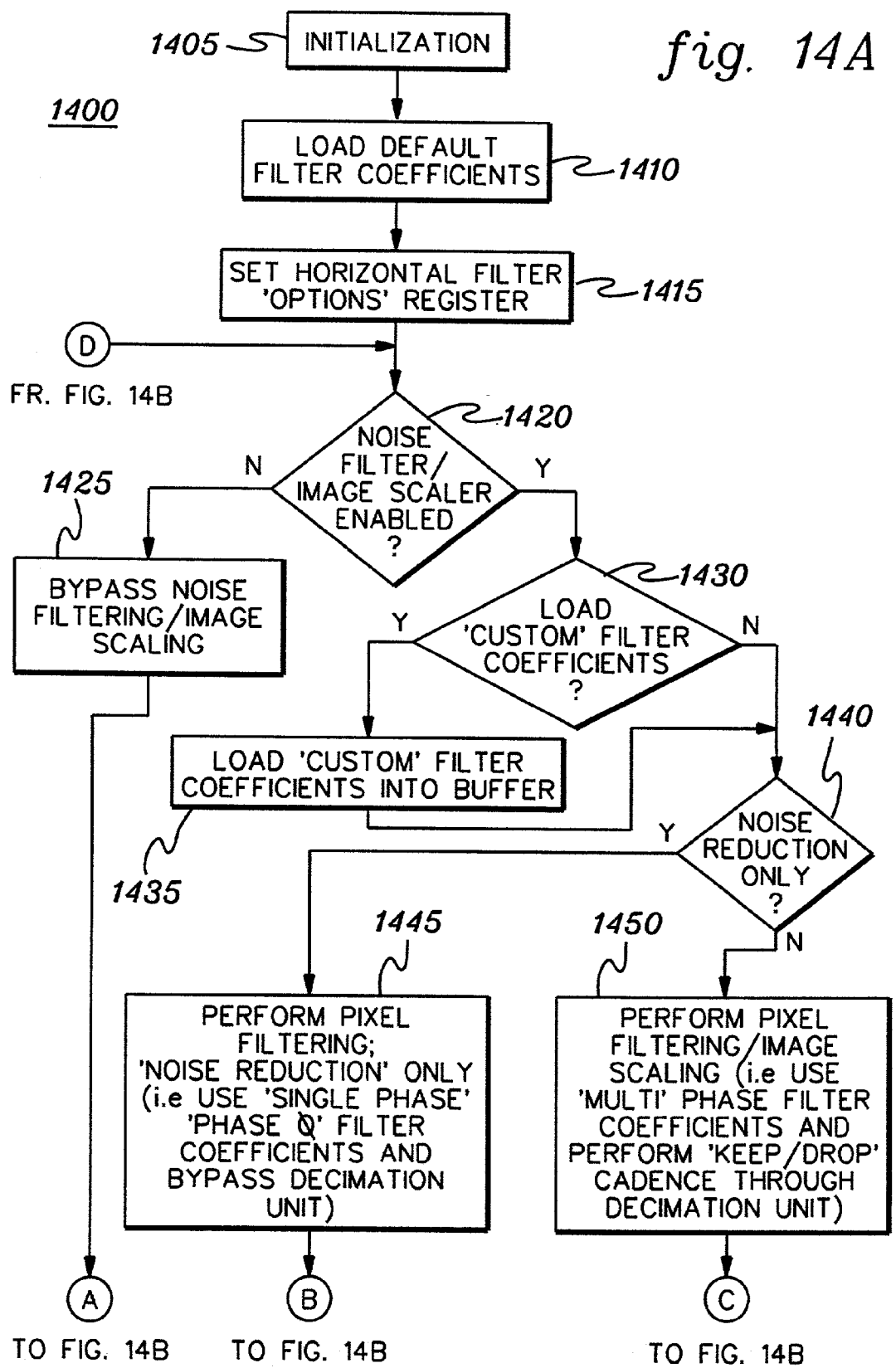
FIGS. 14A & 14B illustrate another embodiment of a process for programmably horizontally filtering pixel values, in accordance with an aspect of the present invention.
Figure 14B:
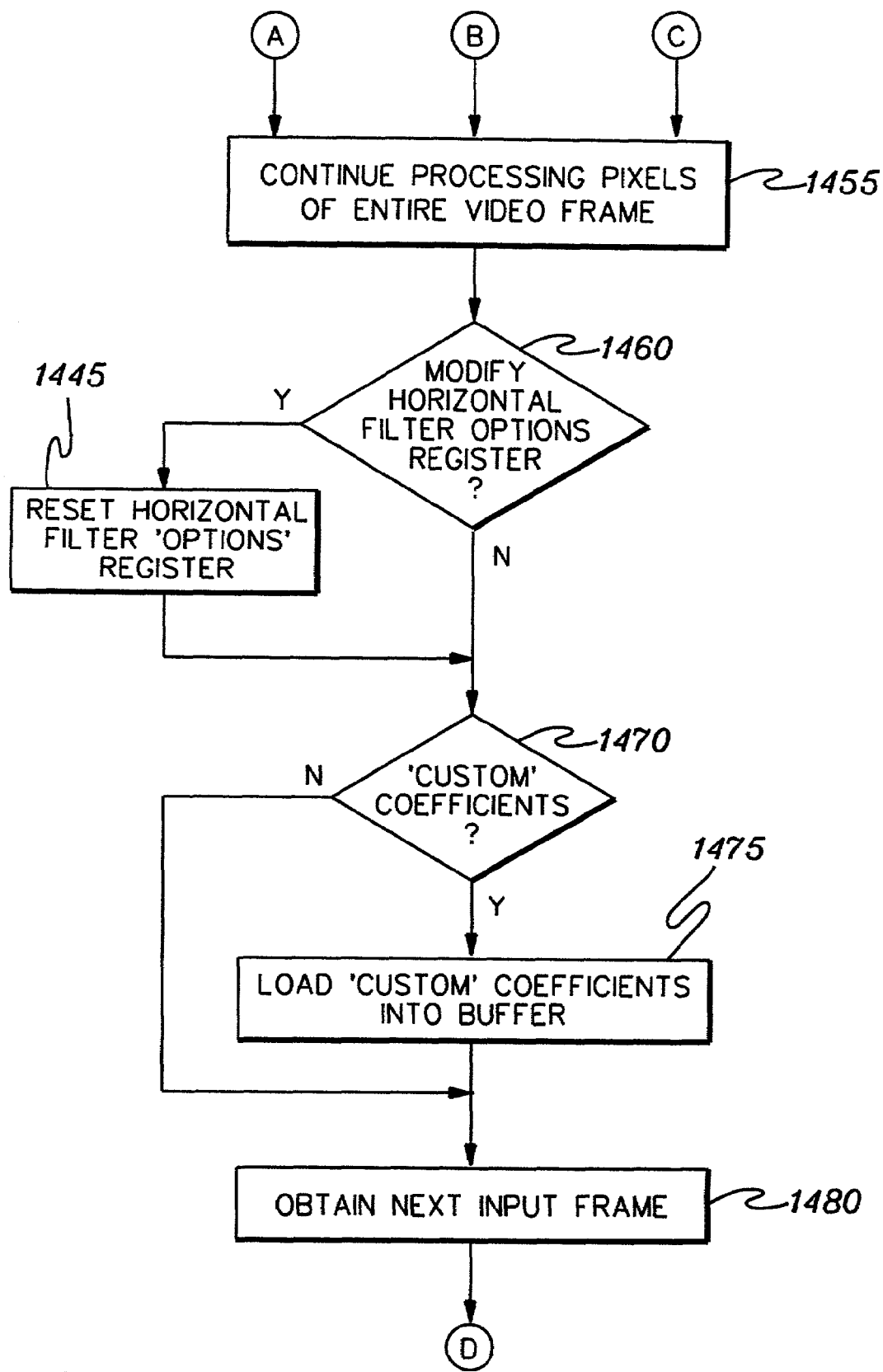

FIGS. 14A & 14B depict another embodiment of a process for programmably horizontally filtering pixel values, in accordance with aspects of the present invention. This process, generally denoted 1400, begins with initialization 1405 of the video encode system. Default filter coefficients are loaded 1410, for example, by internal microcode. A horizontal filter options register is then set by a user 1415, and processing inquires whether noise filter/image scaler processing is enabled 1420.

As used herein, the horizontal filter options register can be used to enable filtering, and to select whether to perform noise reduction only or noise reduction and image scaling. If the filter is enabled with a write to this register, and the user does not load custom filter coefficients into the horizontal filter coefficients buffer, then the filter logic uses default coefficients. The filter options register could employ a 4 bit decode to enable/disable horizontal filtering, to select among multiple noise reduction only filters, and to select among different scaling options, as discussed above.

From inquiry 1420, if "no", then the noise filtering/image scaling processes are bypassed 1425.

Assuming that noise filtering or noise filtering and image scaling is enabled, then processing determines whether the user wishes to load custom filter coefficients 1430. If "yes", then the custom filter coefficients are loaded into a coefficients buffer 1435. In one embodiment, a horizontal filter load/write control register could be employed in this process, along with a custom filter coefficients register. The control register could be used to select a "filter id", as well as a "phase id" for the particular filter selected. The custom filter coefficients register would contain the custom coefficient values to be loaded (e.g., into the horizontal filter coefficients buffer) following a write to of the horizontal filter load/write control register. Consecutive writes to this register may be employed, with one write for each of the coefficients in the filter. Note further that when writing custom coefficients, the sum of all taps within a given phase should equal 256 since the original pixel values are assumed to comprise 8 bits, i.e., 0–255 in value. All phases for a given filter option should also be written. Note that noise reduction only options are one phase (i.e., phase 0 of a corresponding re-size filter).

Processing next determines whether noise reduction only is programmed 1440. If so, then pixel value filtering is performed using a single phase of filter coefficients, with the output bypassing the decimation unit of the image scaler 1445. Otherwise, both pixel value filtering and image scaling is performed using multiple filter coefficient phases 1450 as discussed above.

As shown in FIG. 14B, the pixel value filtering 1445 or pixel value filtering and image scaling 1450 continues for an entire video frame 1455. While processing a current video frame, process 1400 determines whether the user wishes to modify the horizontal filter options register settings 1460. If "yes", then the horizontal filter options register is newly set by the user 1465. Process 1400 also determines whether the user wishes to load new custom filter coefficients 1470. If "yes", then the custom filter coefficients are loaded into a coefficients buffer by the user 1475. Again, the setting of the horizontal filter options register, and the loading of custom filter coefficients occur simultaneous to processing of a current video frame. Upon reaching a frame boundary, the new horizontal filter options and/or custom filter coefficient can be switched in for use by the horizontal filter. A next input frame 1480 is obtained, and processing loops back to inquiry 1420 to repeat the process for the pixel values of this next input frame.

As noted by the above examples, the filter/image scaler presented herein is programmable dynamically in a number of ways. For example, a user can program in custom filter coefficients for use by the noise reduction filter/image scaler, a user can select whether to perform noise reduction filtering/image scaling (e.g., a user can select whether to perform only noise reduction filtering, or both noise reduction filtering and image scaling), and a user can dynamically change filter options and coefficients.

To summarize, those skilled in the art will note that presented herein are various embodiments of a horizontal filter for filtering/scaling video pixels that are horizontally scanned in and are spatially adjacent to one another. The noise filter/image scaler presented is a multi-tap, multi-phase filter (i.e., has multiple phases applied for image scaling). This noise filter/image scaler device can be integrated into front end logic of a video compression engine, and does not require its own separate ASIC device. The filter/scaler is advantageous in that it performs operations in real time (e.g., 30 frames/sec for NTSC video std). The device does not require large amount of input pixel data buffering since the filtering/scaling can be performed on groups of 8 or 4 input pixels "on the fly", as the video images are scanned in horizontally, line by line. The filter/scaler device adds no extra latency to the input pixel processing.

Further, the filter/scaler presented herein has the ability to program in filter coefficients for multiple filters (for example, when initially powered on) or through a user interface, can accept user inputted filter coefficients. With multiple filters loaded and resident on the device, a user can switch between filter coefficients and scaler options on the fly, for example, at input picture boundaries. This is desirable since the user may want to account for scene changes in the video source or account for new video sequences in that source, e.g., caused by on the fly input video source switching. Further, by using the filter/scaler presented herein, new filter coefficients may be loaded dynamically, on the fly, while the horizontal filtering of pixels continues. These newly loaded filter coefficients can then be switched in at a next input frame boundary as described above.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of filtering pixels of video frames, said method comprising:
obtaining pixel values of video frames of a plurality of video frames;
employing a programmable horizontal filter to programmably, spatially horizontally filter said pixel values of said video frames using a first set of filter coefficients;
during said horizontally filtering of pixel values using the first set of filter coefficients, dynamically loading a second set of filter coefficients into said programmable horizontal filter; and
switching said programmable horizontal filter to horizontal filtering pixel values using the dynamically loaded second set of filter coefficients upon reaching a frame boundary between video frames of said plurality of video frames.

2. The method of claim 1, wherein said horizontally filtering comprises programmably horizontally noise filtering said pixel values of said video frames.

3. The method of claim 2, wherein said horizontally filtering further comprises programmably image scaling said pixel values of said video frames.

4. The method of claim 1, wherein said filter coefficients comprise at least two programmable luminance filter coefficients and at least two programmable chrominance filter coefficients.

5. The method of claim 4, wherein said at least two luminance filter coefficients and said at least two chrominance filter coefficients are dynamically programmable during said horizontally filtering of pixel values of said video frames.

6. The method of claim 1, wherein said horizontally filtering further comprises programmably selecting whether to perform horizontal noise reduction filtering only, or horizontal noise reduction filtering and image scaling on said pixel values of said video frames.

7. The method of claim 6, further comprising implementing said method within preprocessing logic of a video encode system, wherein said horizontally filtering occurs in real time.

8. The method of claim 1, wherein said horizontally filtering comprises programmably horizontally noise filtering and image scaling said pixel values of said video frames.

9. The method of claim 8, wherein said programmably horizontally noise filtering and image scaling of said pixel values occurs in real time.

10. The method of claim 9, wherein said first set of filter coefficients and said second set of filter coefficients each comprises multiple banks of coefficients and wherein said horizontally filtering occurs on the fly.

11. The method of claim 10, wherein each set of filter coefficients comprises multiple phases of filter coefficients, and wherein each phase comprises a distinct and separate group of filter tags.

12. The method of claim 10, wherein said switching comprises dynamically switching between said sets of filter coefficients on a per frame basis for a sequence of frames of the plurality of video frames.

13. The method of claim 11, further comprising employing a single phase of said multiple phases when noise filtering said pixel values and employing at least two phases of said multiple phases when image scaling said pixel values, said one phase being other than said at least two phases.

14. The method of claim 13, further comprising allowing programmable selection of a set of filter coefficients and a phase of the set of filter coefficients for initial use in horizontally filtering said pixel values.

15. A system for filtering pixels of video frames, said system comprising:
- means for obtaining pixel values of video frames of a plurality of video frames;
- a programmable horizontal filter, said programmable horizontal filter comprising means for programmably, spatially horizontally filtering said pixel values of said video frames using a first set of filter coefficients;
- means for dynamically loading a second set of filter coefficients into the programmable horizontal filter during said horizontally filtering of pixel values using the first set of filter coefficients; and
- means for switching the horizontal filter to horizontal filtering of pixel values using the dynamically loaded second set of filter coefficients upon reaching a frame boundary between video frames of said plurality of video frames.

16. The system of claim 15, wherein said means for horizontally filtering comprises means for programmably horizontally noise filtering said pixel values of said video frames.

17. The system of claim 16, wherein said means for horizontally filtering further comprises means for programmably image scaling said pixel values of said video frames.

18. The system of claim 15, wherein said filter coefficients comprise at least two programmable luminance filter coefficients and at least two programmable chrominance filter coefficients.

19. The system of claim 18, further comprising means for dynamically programming said at least two luminance filter coefficients and said at least two chrominance filter coefficients during said horizontally filtering of pixel values of said video frames.

20. The system of claim 15, wherein said means for horizontally filtering further comprises means for programmably selecting whether to perform horizontal noise reduction filtering only, or horizontal noise reduction filtering and image scaling on said pixel values of said video frames.

21. The system of claim 20, further comprising means for implementing said system within preprocessing logic of a video encode system, wherein said horizontally filtering occurs in real time.

22. At least one program storage device readable by a machine, tangibly embodying at least one program of instructions executable by the machine to perform a method of filtering pixels of video frames, said method comprising:
- obtaining pixel values of video frames of the plurality of video frames;
- programmably, spatially horizontally filtering said pixel values of said video frames using a first set of filter coefficients;
- during said horizontally filtering of pixel values using the first set of filter coefficients, dynamically loading a second set of filter coefficients; and
- switching the horizontal filtering of pixel values to using the dynamically loaded second set of filter coefficients upon reaching a frame boundary between video frames of said plurality of video frames.

* * * * *